April 24, 1956 T. A. ST. CLAIR 2,742,785
METER DIAPHRAGM
Filed April 29, 1954 3 Sheets-Sheet 1

INVENTOR.
THEODORE A. ST. CLAIR
BY
RICHEY, WATTS, EDGERTON & McNENNY
ATTORNEYS

April 24, 1956 T. A. ST. CLAIR 2,742,785
METER DIAPHRAGM
Filed April 29, 1954 3 Sheets-Sheet 2
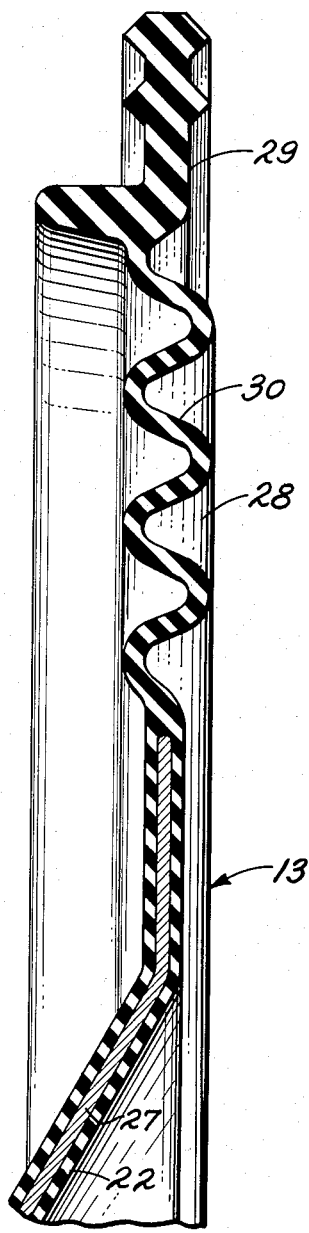
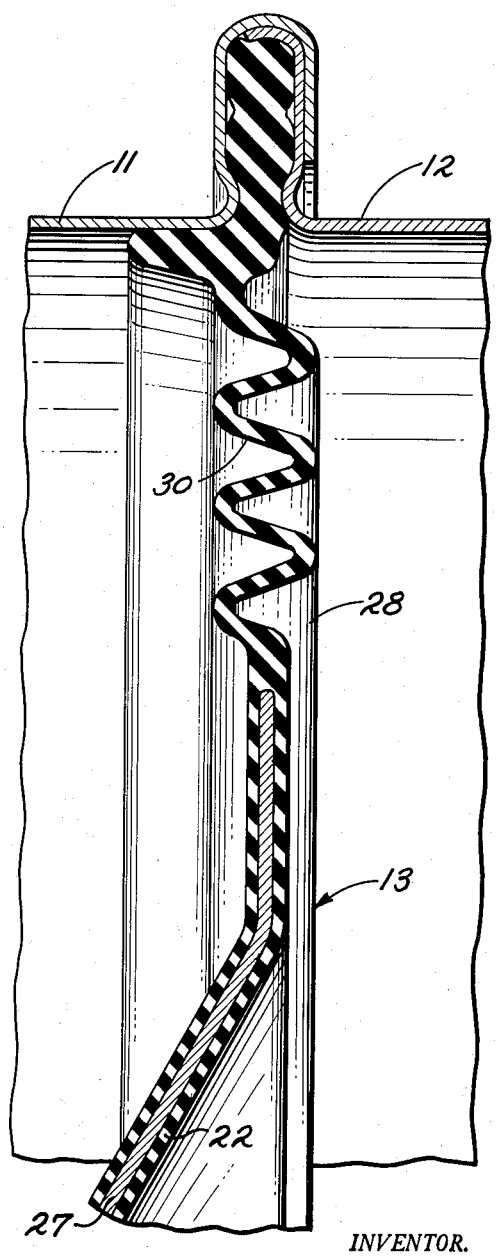
INVENTOR.
THEODORE A. ST. CLAIR
BY
RICHEY, WATTS, EDGERTON & McNENNY
ATTORNEYS April 24, 1956  T. A. ST. CLAIR  2,742,785
METER DIAPHRAGM Filed April 29, 1954  3 Sheets-Sheet 3

INVENTOR.
THEODORE A. ST. CLAIR
BY RICHEY, WATTS, EDGERTON & McNENNY
ATTORNEYS

United States Patent Office 2,742,785
Patented Apr. 24, 1956

2,742,785

METER DIAPHRAGM

Theodore A. St. Clair, Cleveland, Ohio, assignor to The Weatherhead Company, Cleveland, Ohio, a corporation of Ohio Application April 29, 1954, Serial No. 426,521

3 Claims. (Cl. 73—279)

This invention relates to diaphragms in general and more particularly to a diaphragm to be used in a gas meter.

The major problems in accurately measuring gas by the positive displacement method is to obtain good volume stability (reproductability of volumes of gas) and at the same time obtain reciprocation with extremely low differential pressures. In the past, meters have been provided with flexible partitions or diaphragms formed of leather treated with a suitable softening agent. These leather diaphragms were formed either into bags or bellows. In either case, they required a considerable amount of hand labor for the forming, sewing and assembly. These leather bellows have not been too satisfactory since leather dries, hardens and shrinks causing serious difficulties to the proper meter operation. Attempts have been made to use relatively flat pan-type rubber or synthetic rubber diaphragms in such meters but they have been unsuccessful because they are either too soft when properly flexible or too stiff so that excessive pressure differentials are necessary in operation.

An important object of this invention is to provide a diaphragm which may be molded economically and which will provide positive uniform gas measurement and which will not require excessive differential pressure for the operation.

It is another object of this invention to provide positive displacement gas meter including a molded diaphragm which requires small pressure differentials for the operation of the meter and which provides a uniform displacement.

It is still another object of this invention to provide a flexible diaphragm for use in metering applications wherein an extremely long service life is assured with little or no danger of failure or need of maintenance.

It is still another object of this invention to provide a diaphragm movable between two spaced positions wherein the diaphragm tends to remain in either of the positions to which it is moved.

It is still another object of this invention to provide a flexible diaphragm movable between two spaced positions wherein the stresses in the diaphragm are in the lowest value when the diaphragm is in either of the two positions.

Further objects and advantages will appear from the following description and drawings, wherein:

Fig. 2 is a partial cross-section of the flexible portion of a diaphragm according to this invention in its unstressed molded condition;

Fig. 3 is a partial cross section of the same portion of the diaphragm shown in Fig. 2 with the periphery compressed to stress the diaphragm as it will be used in the meter;

Figure 1:
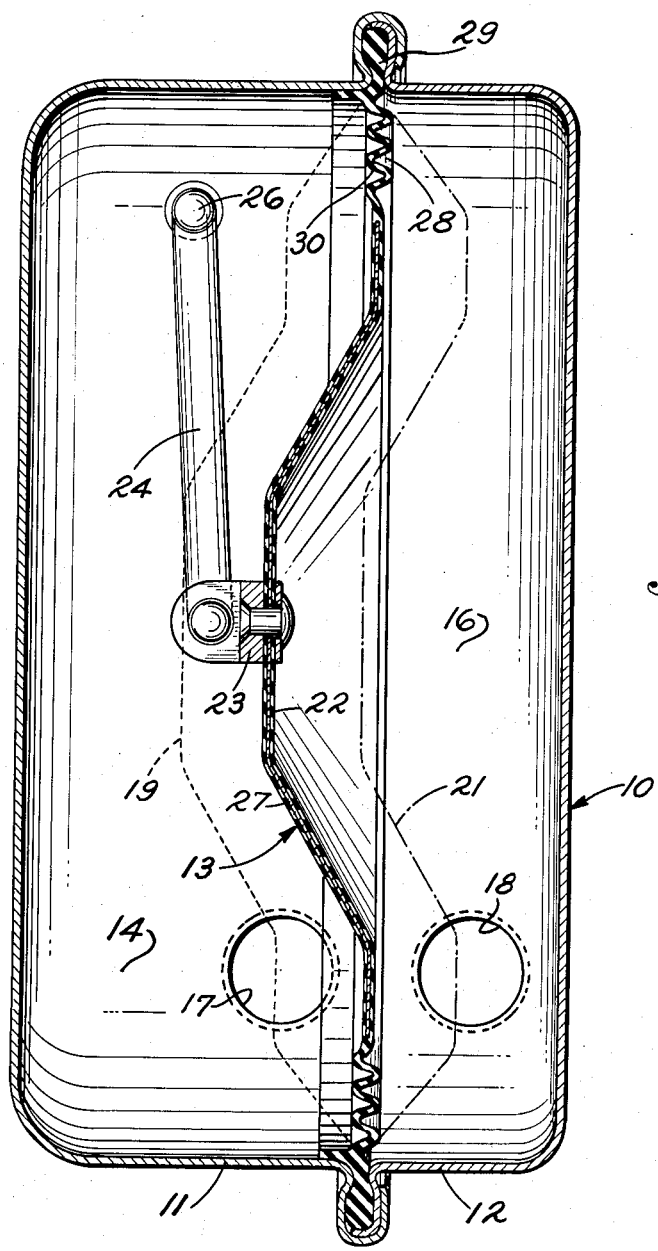
Fig. 1 is a cross section of a diaphragm housing for a gas meter of the positive displacement type with a diaphragm according to this invention mounted therein.

In the preferred gas meter, the diaphragm housings are divided into two chambers by the flexible diaphragm. The diaphragm is arranged so that it may move between two extreme positions under the influence of a differential pressure across the diaphragm. An inlet and outlet are provided for each chamber. Linkage connected to the diaphragm is provided to operate valves which alternately provide for admitting gas to one side of the diaphragm and exhausting it from the other and admitting gas to the other side of the diaphragm and exhausting it from the one side. This linkage is also connected to a counter which counts the number of strokes of the diaphragm thereby providing means for determining the amount of gas which has passed through the meter at any given time. It is important in such a gas meter that the amount of gas displaced by each stroke of the diaphragm be uniform and that the pressure differential necessary to operate the diaphragm be maintained at a minimum. These two qualities are difficult to obtain in the same diaphragm since uniform displacement requires a relatively stiff diaphragm and low pressure differential require a flexible diaphragm. This invention provides a diaphragm which is relatively stiff and which also may be moved between its extreme positions with relatively low differential forces and therefore low differential pressures.

A diaphragm according to this invention comprises relatively rigid central portion, a peripheral portion adapted to be clamped into sealing engagement with the meter structure and a flexible portion therebetween. The flexible portion provides for relatively large motion of the central portion relative to the peripheral portion with low stresses present therein. In a metering apparatus, the central portion of the diaphragm moves between the two extreme positions relative to the peripheral portion and the flexible portion is arranged so that the lowest stresses will be contained therein in these two positions. For a clear understanding of the invention, reference should be made to the drawings.

The diaphragm housing 10 comprises two shell portions 11 and 12. The two shell portions 11 and 12 are generally cup shaped and are adapted to clamp the periphery of the diaphragm 13 so that the diaphragm and shell portion 11 form a first chamber 14 and the diaphragm and the shell portion 12 form the second chamber 16. The port 17 is provided in the shell 11 to provide for the flow of gas into and out of the chamber 14 and a similar port 18 is provided for the flow of gas into and out of the chamber 16. In a complete gas meter, valves are provided to alternately connect the ports 17 and 18 with a source of supply and the system to be supplied. The diaphragm 13 includes a central portion 22 arranged to move between two positions 19 and 21 shown in phantom. The central portion 22 of the diaphragm is provided with a mounting block 23 to which is pivoted the link 24. This link 24 is also pivoted as at 26 and is arranged to operate the valves as well as a counter which records the number of strokes of the diaphragm.

When the diaphragm is in the position shown in phantom as at 19, the valves operate so as to connect the port 17 to a source of supply and a port 18 to a system to be supplied. As the gas or other fluid being measured is used by the system to be supplied, it causes a slight differential pressure to be present across the diaphragm thereby causing the diaphragm to move toward the position shown in phantom at 21. This permits flow of gas into the port 17 and out of the gas port 18 and the amount of such gas flow being equal to the volume displaced by the diaphragm as it moves between the two positions. When the diaphragm reaches the position shown as 21, the valves are operated by the link 24 to connect the port 18 to the source of supply and the port 17 to the system supplied and also to operate a counter which maintains a record of the number of strokes of the diaphragm. The diaphragm then is moved by the differential pressure back to the position 19 and this sequence continues so long as gas is being used by the system supplied.

Because the largest amount of valve movement takes place when the diaphragm approaches the extreme positions, the largest amount of work is done by the diaphragm at these times. If a pan-type diaphragm is used also the diaphragm is stressed to the highest degree in the extreme positions. It is therefore apparent that these conditions combined to require relatively large differential pressure to the pan-type diaphragm. It is, therefore, necessary in the conventional pan-type diaphragm to form the diaphragm of soft yieldable material which is highly flexible. This causes difficulty due to the fact that non-uniform displacement occurs if the diaphragm is too flexible.

To overcome these difficulties, a diaphragm according to this invention provides a large central portion 22 which is reinforced with a reinforcing or stiffening member 27. In the preferred embodiment, this reinforcing member is molded into the diaphragm proper. Around the central portion 22 is a flexible portion 28 formed with ribs 30 for flexibility and beyond the flexible section 28 is the peripheral bead 29. The number of ribs may be varied to produce the particular characteristics desired. The peripheral bead 29 is adapted to be clamped with the shells 11 and 12 and is molded with a normal unstressed circumferential dimension larger than the diaphragm pocked provided in the shells. In order to maintain the diaphragm within the shells 11 and 12, it is therefore necessary to radially compress the peripheral bead 29 as shown in Figs. 2 and 3 to a point where the ribs of the flexible portion are compressed as shown by comparing Figs. 2 and 3. At this time, the diaphragm is stressed in such a manner that it will tend to move away from the central position toward either the positions 19 or 21 shown in Fig. 1. It is apparent that the ribs will tend to become less stressed when the diaphragm is in either of the spaced positions. This structure provides a diaphragm for use in a metering apparatus which may operate the lower differential pressure and which may be made stiffer than prior art devices.

In operation, the differential pressure moves the diaphragm from the position 19 through central position during which time the stressing of the flexible portion 28 is increased. Motion beyond this point toward the position 21 results in a decrease of the stresses in the flexible portion and requires less differential pressure of the gas. It is apparent that as a result most of the forces, necessary to operate the valves and counter, occur when no internal force will tend to restrain further motion of the diaphragm. In fact, the diaphragm itself supplies some of the force necessary to operate the valves and counter. The same situation occurs when the diaphragm moves back to the position 19 where the diaphragm again augments the force necessary to operate the valves and the counter. It is apparent that the forces overcome by the differential pressure on the diaphragm do not occur simultaneously so that differential pressures are smaller than those necessary in the prior art devices.

Accuracy of the metering operation will be maintained also if the differential pressure across the diaphragm is maintained at a low level when the diaphragm approaches either of its extreme positions. This is true even if the differential pressure becomes somewhat larger during interim positions of the diaphragm. Those skilled in the art will realize that the volumetric displacement of the diaphragm between the two positions equals the amount of gas measured and that as long as the differential pressure is small when the end positions are reached, a very high degree of accuracy will be maintained.

The material used to mold the diaphragm is preferably rubber or synthetic rubber, however, other moldable materials might be used providing they can withstand a large number of deflections without failure.

Figure 4:
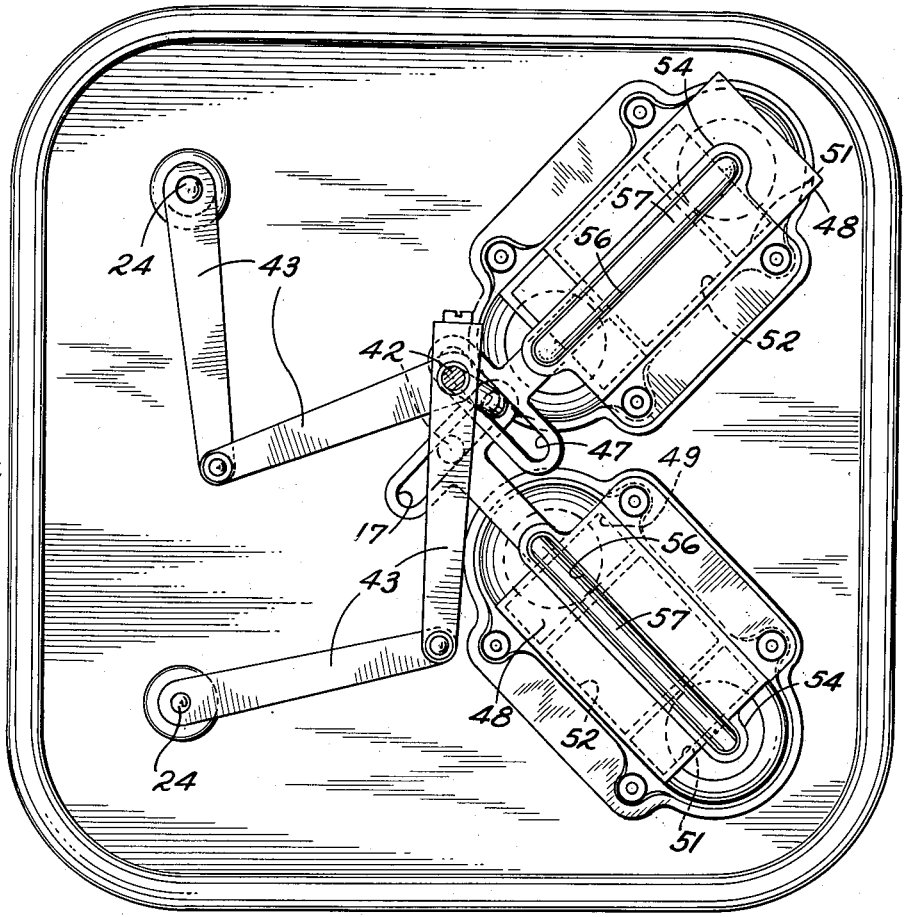
Fig. 4 is a plan view, with portions removed, showing a preferred valve structure for the meter; and, Fig. 5 is a side elevation of the valves shown in Fig. 4.
Figure 5:
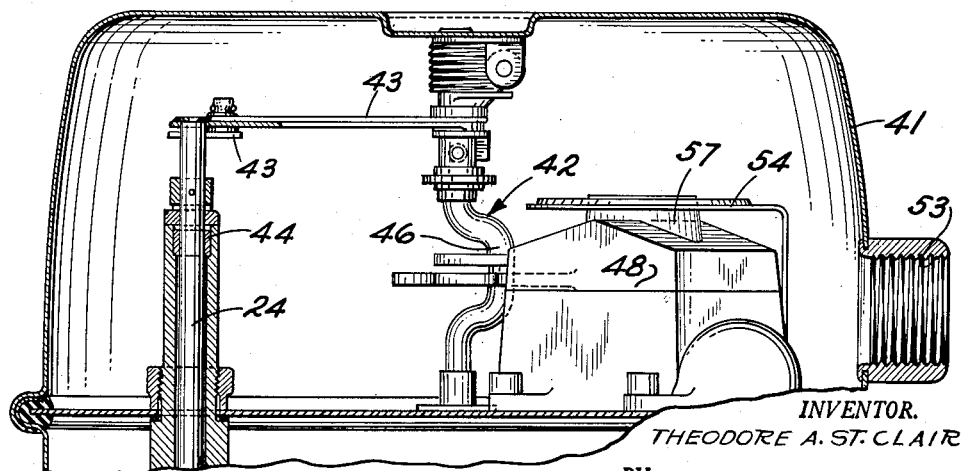

A preferred valving structure is shown in Figs. 4 and 5 wherein the valve machanism chamber is shown. Two diaphragm housings 10 are provided in each meter and are located below the valve housing 41. The links 24 extend from each of the diaphragm housings up into the valve housing 41 and are connected to the crank 42 by means of the crank arms 43. As the diaphragms move, the crank 42 is rotated by the crank arms 43. A suitable bearing 44 supports the links 24 for their rotational movement. The crank 42 is provided with an eccentric 46 which extends through the lateral slots 47 in the slide valve 48. A slide valve 48 is provided for each of the diaphragm housings 10 and is arranged to alternately connect the chambers 14 and 16 to the supply of gas and the system to be supplied. The port 17 of one of the diaphragms would be connected to the valve opening 49 and the port 18 would be connected to the valve opening 51. The system to be supplied is connected to the valve outlet 52 and the source of gas to be metered is connected to the inlet 53 in the valve housing 51. As the slide valve slides back and forth, the valve openings 49 and 51 will either be in fluid communication with the interior of the valve housing 41, and in turn the source, or in fluid communication with the valve outlet 52. In Fig. 4, the upper valve is in the position which connects the valve openings 51 to the valve outlet 52 and the valve openings 49 are uncovered providing fluid communication with the inlet 53. The lower valve is shown in the position wherein the valve is moving between the two positions and the outlet 52 is isolated from both valve openings. It is apparent that the valves are 90° out of phase and this insures that the diaphragms will be in turn 90° out of phase at all times so that the meter will be able to start after stopping in any possible position. The valve guides 54 are provided with slot 56 through which the projections 57 on the valves 48 project. This structure insures that the valves move back and forth in their operation with a linear motion.

In the preferred form of this invention, the housings 10 are arranged so that they may be removably installed in the assembled meter. This is desirable since the diaphragm must be radially compressed during the mounting in the housing. It is apparent that installation problems are greatly relieved by arranging the apparatus so that the housings 10 may be removed to replace a diaphragm and then reinserted in the assembled meter.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. A molded diaphragm for a round meter chamber comprising a rigid central portion, a peripheral portion adapted to be secured to the chamber wall and an annular flexing portion connecting said central and peripheral portions, said flexing portion having molded therein annular folds, said diaphragm normally having a diameter exceeding its diameter when assembled in the chamber whereby said folds are decreased in diameter and stressed to bias the central portion of the diaphragm away from the plane of its attachment to the chamber wall.

2. In a gas meter, means forming a round chamber, a round molded diaphragm mounted in said chamber, said diaphragm comprising a rigid central portion, a non-flexing peripheral attaching portion and an intermediate annular portion having molded therein annular folds, said diaphragm normally having a diameter that exceeds its diameter when assembled in the chamber whereby the central portion thereof is biased away from the plane of the peripheral attaching portion.

3. In a gas meter, means forming a chamber having a circular cross section at the mid portion thereof, a round generally flat molded diaphragm of rubber like material mounted in said chamber at said central section thereof to divide the chamber into two compartments, said diaphragm comprising a rigid central portion, a non-flexing peripheral attaching portion and an annular flexing portion having folds mounted therein connecting said central and peripheral portions, said diaphragm being molded with the central and peripheral portions substantially in the same plane and having a normal diameter exceeding the diameter of the chamber whereby the diameter of the diaphragm is reduced by radial compression thereof to fit within the chamber to bias the central portion of the diaphragm away from said plane after being assembled in the chamber.

References Cited in the file of this patent

UNITED STATES PATENTS

| 1,036,233 | Heeley | Aug. 20, 1912 |
| 1,699,145 | Huettig | Jan. 15, 1929 |

FOREIGN PATENTS

| 3,827 | Great Britain | 1875 |